US011968088B1

(12) United States Patent
Yan et al.

(10) Patent No.: US 11,968,088 B1
(45) Date of Patent: Apr. 23, 2024

(54) ARTIFICIAL INTELLIGENCE FOR INTENT-BASED NETWORKING

(71) Applicant: Microsoft Technology Licensing, LLC, Redmond, WA (US)

(72) Inventors: Yu Yan, Issaquah, WA (US); Ryan Andrew Beckett, Redmond, WA (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/330,933

(22) Filed: Jun. 7, 2023

(51) Int. Cl.
G06F 15/177 (2006.01)
G06F 40/30 (2020.01)
G06F 40/40 (2020.01)
H04L 41/0823 (2022.01)

(52) U.S. Cl.
CPC .......... *H04L 41/0823* (2013.01); *G06F 40/30* (2020.01); *G06F 40/40* (2020.01)

(58) Field of Classification Search
CPC ....... H04L 41/0823; G06F 40/30; G06F 40/40
See application file for complete search history.

(56) References Cited

U.S. PATENT DOCUMENTS

| 2011/0137653 | A1* | 6/2011 | Ljolje | G10L 15/183 |
| | | | | 704/E15.001 |
| 2022/0207321 | A1* | 6/2022 | Gulati | G10L 21/0272 |
| 2023/0141398 | A1* | 5/2023 | Bahdanau | G06F 40/30 |
| | | | | 704/9 |
| 2023/0223016 | A1* | 7/2023 | Konam | G06F 40/284 |
| | | | | 704/231 |
| 2023/0305822 | A1* | 9/2023 | Ferrucci | G06N 20/00 |
| 2023/0343324 | A1* | 10/2023 | Baeuml | G10L 15/22 |
| 2023/0367973 | A1* | 11/2023 | Konam | G06F 40/40 |

FOREIGN PATENT DOCUMENTS

| CN | 116430999 A | * | 7/2023 | |
| WO | WO-2023172817 A1 | * | 9/2023 | ............. G06F 8/10 |
| WO | WO-2023205204 A1 | * | 10/2023 | ............. G06N 20/00 |

* cited by examiner

*Primary Examiner* — Richard G Keehn
(74) *Attorney, Agent, or Firm* — ArentFox Schiff LLP (57) ABSTRACT

Example implementations include a method, apparatus, and computer-readable medium configured for generating a network configuration using a large language model (LLM). The apparatus receives, at an interface between a user and LLM, a natural language intent for a network configuration. The apparatus requests the large language model to update the network configuration to an updated network configuration that satisfies the natural language intent in a declarative network configuration language. The apparatus verifies whether the updated network configuration satisfies a configuration syntax of the declarative network configuration language to detect an error. The apparatus requests the large language model to update the updated network configuration to correct the error. The apparatus deploys the updated network configuration to a user network.

21 Claims, 7 Drawing Sheets

ARTIFICIAL INTELLIGENCE FOR INTENT-BASED NETWORKING

BACKGROUND

Network management is a laborious and error-prone process. Conventionally, each network element has a separate configuration that controls operation of the network element. Although there may be similarities between configurations of similar network elements, the differences between the configurations may significantly impact network operation. Further, network configurations are often expressed in a configuration language or in code that requires domain expertise to understand. For example, network configurations may rely on detailed syntax rules.

Large Language Model (LLM) is a term that refers to artificial intelligence or machine-learning models that can generate natural language texts from large amounts of data. Large language models use deep neural networks, such as transformers, to learn from billions or trillions of words, and to produce texts on any topic or domain. Large language models can also perform various natural language tasks, such as classification, summarization, translation, generation, and dialogue. Accordingly, a LLM may have potential for assisting in network management. LLMs, however, are also prone to various errors.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus including: one or more memories storing computer executable instructions; and one or more processors coupled with the one or more memories and, individually or in combination, configured to: receive, at an interface between a user and a large language model, a natural language intent for a network configuration; request the large language model to update the network configuration to an updated network configuration that satisfies the natural language intent in a declarative network configuration language; verify whether the updated network configuration satisfies a configuration syntax of the declarative network configuration language to detect an error; request the large language model to update the updated network configuration to correct the error; and deploy the updated network configuration to a user network.

In some aspects, the techniques described herein relate to a method including: receiving, at an interface between a user and a large language model, a natural language intent for a network configuration; requesting the large language model to update the network configuration to an updated network configuration that satisfies the natural language intent in a declarative network configuration language; verifying whether the updated network configuration satisfies a configuration syntax of the declarative network configuration language to detect an error; requesting the large language model to update the updated network configuration to correct the error; and deploying the updated network configuration to a user network.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to intent-based networking using a large language model (LLM) to generate a network configuration. Due to the laborious and error-prone nature of network configuration, automation via computerized tools has been proposed for network configuration. Intent-based networking (IBN) refers to techniques to realize high-level policies expressed in natural language. IBN, however, faces technical challenges in implementation in computer systems. In particular, computer systems have conventionally had difficulty comprehending natural language intents and translating intents into low-level network configurations.

Recent advances in large language models make an artificial intelligence approach to IBN viable. For example, large language models include a Generalized Pre-trained Transformer (GPT) model. A GPT model may include millions or billions of parameters trained on vast amounts of data (e.g., gigabytes or terabytes of text). A GPT model is a type of neural network that uses a transformer architecture to learn from large amounts of text data. A GPT model is capable of analyzing the syntax and context of a natural language intent, for example, based on embeddings of tokens within the natural language intent. Additionally, a GPT model may have included network configurations in the training corpus, or may be further trained based on existing network configurations. In particular, LLM models known as GPT 3.5 and above from OpenAI, have been able to generate text that is close to a declarative network configuration language such as Terraform when prompted with a natural language intent for network configuration.

A general problem with LLMs, however, is the possibility of errors. For example, common errors generated by LLMs include hallucinations, where the LLM outputs facts with no basis in reality. For instance, in a network configuration, a hallucination may refer to a network entity that does not exist. Accordingly, if an LLM is used to generate text for a network configuration, such configuration may not be trustworthy. If deployed on a live network, an untrustworthy network configuration including errors may generate further errors in network operation.

In an aspect, the present application discloses an interface for generating network configurations using a LLM that also performs safety checks and corrects errors in the network configuration. For example, the interface may be an application that modifies and supplements natural language intents provided by a user and interactively corrects errors in a network configuration. The network configuration may be generated in a declarative network configuration language that allows verification of syntax and identification of errors. The interface can provide the errors back to the LLM for correction. The user remains in the loop for error correction and approves the network configuration prior to deployment. Accordingly, the interface may generate a network configuration that is at least as safe as a human generated network configuration. Additionally, in some implementations, the interface may leverage a network verifier to perform additional user-specified checks on a network deployment. For example, the network verifier may perform reachability checks on a deployed network and provide helpful error messages when the reachability checks fail. The user may then provide a new intent to update the network configuration to resolve the failed checks.

Implementations of the present disclosure may realize one or more of the following technical effects. Feedback of error messages from a network configuration verifier to a large language model allows semi-automated correction of errors in network configurations generated by an LLM while keeping a human user in the loop to monitor configuration changes. Embedding based retrieval to select resource blocks to provide to the LLM when network configuration size exceeds prompt token limit allows network configuration size to exceed the token limit of the LLM by identifying the most relevant resource blocks to update based on the user intent. That is, the size of the network configuration is not constrained by the token limit of the LLM. Verification of network deployment according to user specified checks ensures that the deployed network is operating as intended.

Figure 2:
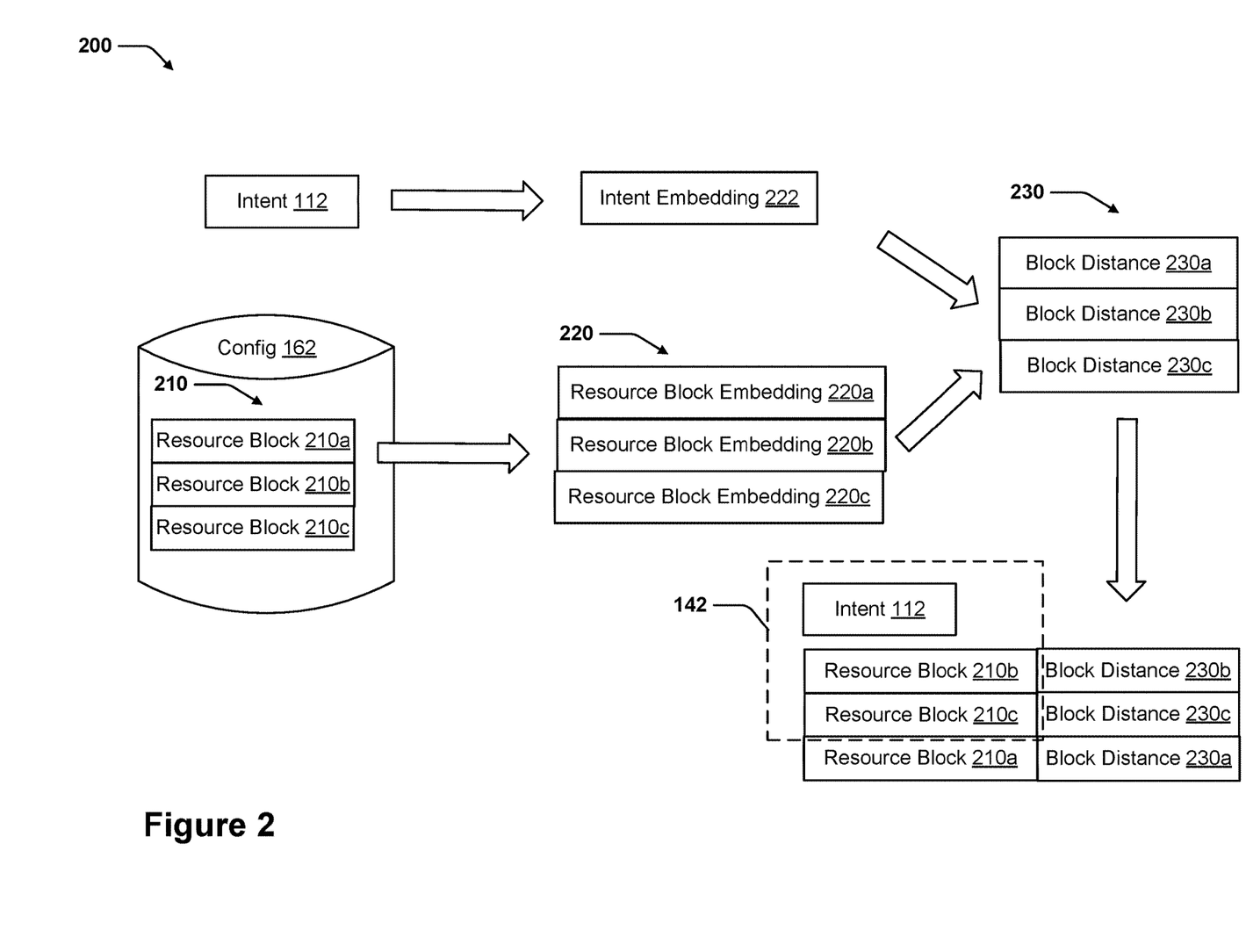
FIG. 2 is a conceptual diagram illustrating a technique for reducing a size of input to the LLM, in accordance with aspects described herein.
Figure 3:
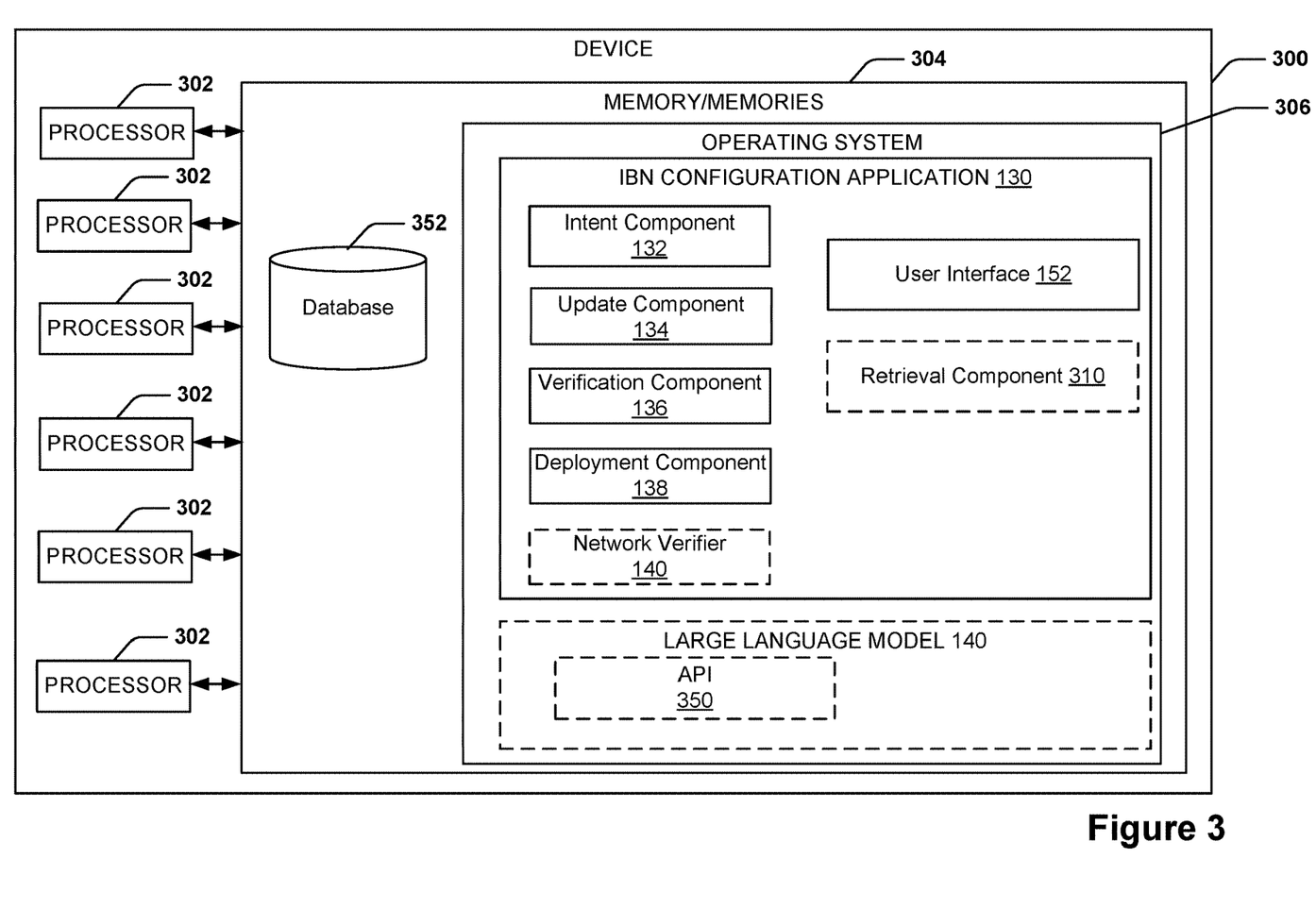
FIG. 3 is a schematic diagram of an example of an apparatus (e.g., a computing device) for generating network configurations using a LLM, in accordance with aspects described herein.
Figure 4:
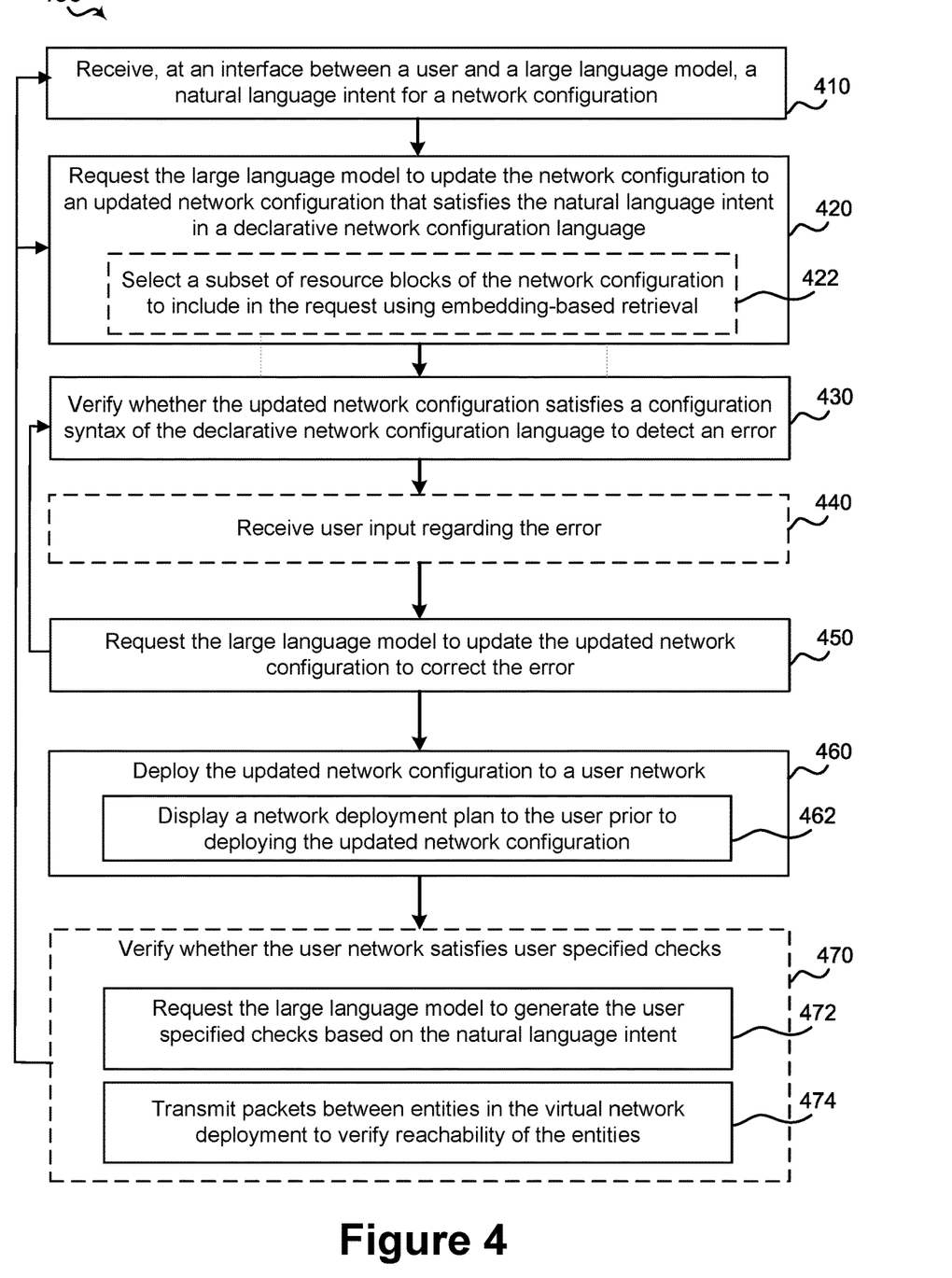
FIG. 4 is a flow diagram of an example of a method for generating a network configuration using a LLM, in accordance with aspects described herein.
Figure 5:
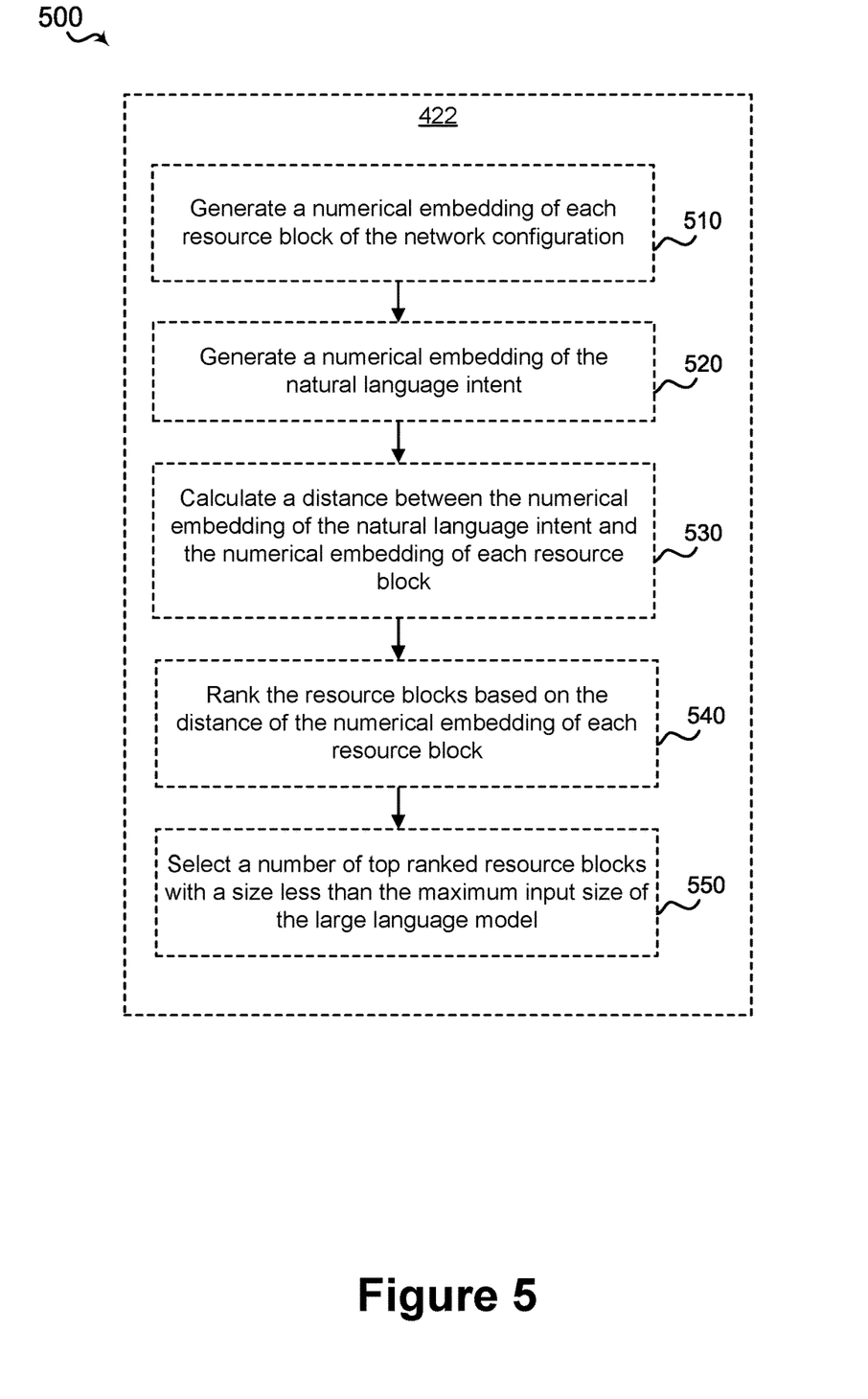
FIG. 5 is a flow diagram of an example of a method for reducing a size of input to the LLM, in accordance with aspects described herein.
Figure 6:
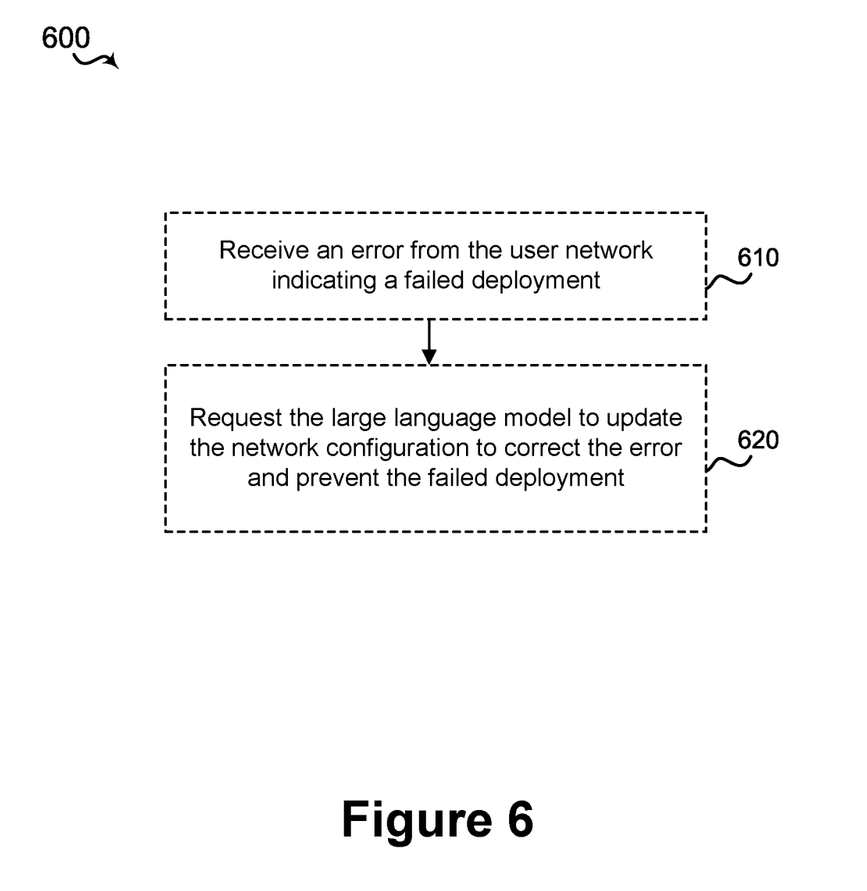
FIG. 6 is a flow diagram of an example of a method for correcting errors indicating a failed network deployment, in accordance with aspects described herein.

Turning now to FIGS. 1-7, examples are depicted with reference to one or more components and one or more methods that may perform the actions or operations described herein, where components and/or actions/operations in dashed line may be optional. Although the operations described below in FIGS. 4-6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
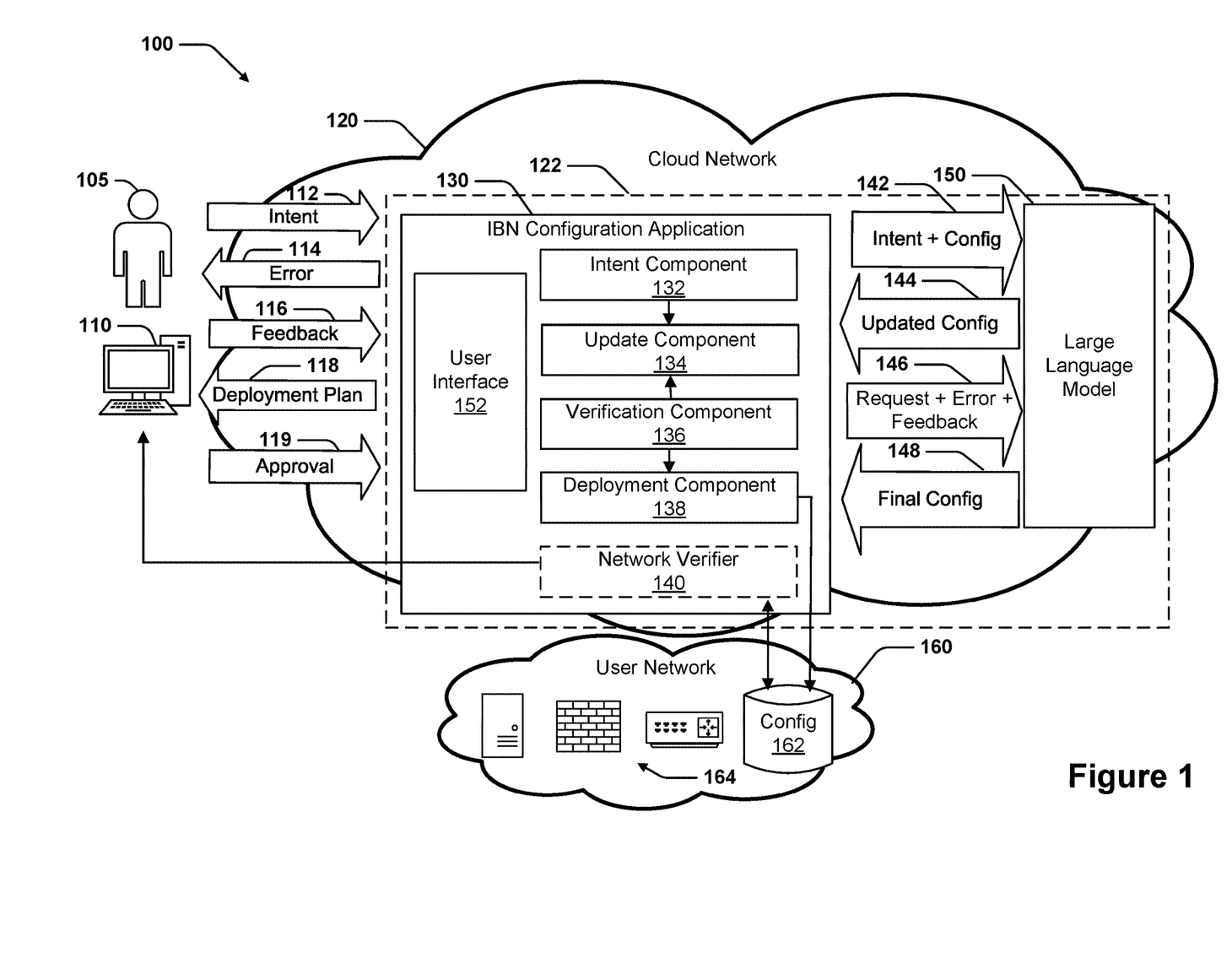
FIG. 1 is a diagram of an example of an architecture for a system to generate a network configuration by applying a user intent to a large language model (LLM), in accordance with aspects described herein.

FIG. 1 is a conceptual diagram 100 of an example of an architecture for a system 120 to generate a network configuration based on an intent 112 from a user 105. The system 120 may be, for example, a cloud network including computing resources that are controlled by a network operator and accessible to public clients such as a user device 110 operated by the user 105. For example, the system 120 may include a plurality of datacenters 122 that include computing resources such as computer memory and processors. In some implementations, the datacenters 122 may host a compute service that provides computing nodes on computing resources located in the datacenter. The computing nodes may be containerized execution environments with allocated computing resources. For example, the computing nodes may be virtual machines (VMs), process-isolated containers, or kernel-isolated containers. The nodes may be instantiated at a datacenter 122 and imaged with software (e.g., operating system and applications for a service). The system 120 may include edge routers that connect the datacenters 122 to external networks such as internet service providers (ISPs) or other autonomous systems (ASes) that form the Internet.

The system 120 may provide a large language model (LLM) 150 that is configured to receive a natural language prompt and output a response. The LLM 150 may be a specific instance or version of a LLM artificial intelligence that has been trained and fine-tuned on a large corpus of text. The LLM 150 may be a Generalized Pre-trained Transformer (GPT) model. For example, a GPT model may include millions or billions of parameters trained on vast amounts of data (e.g., gigabytes or terabytes of text). A GPT model is a type of neural network that uses a transformer architecture to learn from large amounts of text data. The model has two main components: an encoder and a decoder. The encoder processes the input text and converts it into a sequence of vectors, called embeddings, that represent the meaning and context of each word. The decoder generates the output text by predicting the next word in the sequence, based on the embeddings and the previous words. The model uses a technique called attention to focus on the most relevant parts of the input and output texts, and to capture long-range dependencies and relationships between words. The model is trained by using a large corpus of texts as both the input and the output, and by minimizing the difference between the predicted and the actual words. The model can then be fine-tuned or adapted to specific tasks or domains, by using smaller and more specialized datasets. In an implementation, the GPT model versions 3.5 and above from OpenAI may be suitable without further training. In some implementations, a model may be further fine-tuned based on network configurations in a selected declarative network configuration language.

The LLM 150 may provide an application programming interface (API) that allows other applications to interact with the LLM 150. For example, the API may allow a user or application to provide a prompt to the LLM 150. Prompts are the inputs or queries that a user or a program gives to an LLM AI, in order to elicit a specific response from the model. Prompts can be natural language sentences or questions, or code snippets or commands, or any combination of text or code, depending on the domain and the task. Prompts can also be nested or chained, meaning that the output of one prompt can be used as the input of another prompt, creating more complex and dynamic interactions with the model.

An intent-based networking (IBN) configuration application 130 may be an application that interfaces between the LLM 150 and user 105 to generate network configurations for a user network 160. For example, the IBN configuration application 130 may provide a graphical user interface on the user device 110 for the user 105. The IBN configuration application 130 may receive an intent 112 from the user 105. For example, the intent 112 may be expressed in natural language. The IBN configuration application 130 may supplement or revise the intent 112 in order to generate a network configuration that satisfies the intent 112. For example, the IBN configuration application 130 may supplement the natural language intent 112 with an existing network configuration 162 to form a request 142. The IBN application provides the request 142 (e.g., intent+configuration) to the LLM to generate an updated configuration 144 for a user network 160.

In an implementation, the IBN configuration application 130 may be a chat application that stores previous prompts, answers, and context within a session. The stored information for a session may be used to supplement additional natural language intents 112 from the user 105.

In an aspect, the IBN configuration application 130 is configured to verify a network configuration generated by the LLM 150. The verification may occur at several levels. First, the IBN configuration application 130 may verify a syntax of the network configuration based on the declarative network configuration language. Second, the IBN configuration application 130 may include user verification of a network deployment plan based on the network configuration prior to deploying the network configuration. Third, a system on which the network configuration is to be deployed may further verify the validity of the network configuration during deployment. Fourth, after deployment, the IBN configuration application 130 may execute a network verifier to verify whether the deployed network satisfies user specified checks. After any of the verifications, the IBN configuration application 130 may update the intent 112 automatically or with user input to further update the network configuration.

The IBN configuration application 130 includes an intent component 132, an update component 134, a verification component 136, and a deployment component 138. The IBN configuration application 130 may optionally include a network verifier 140. The intent component 132 is configured to receive, at an interface between a user and a large language model, a natural language intent 112 for a network configuration. The update component 134 is configured to request the LLM 150 to update the network configuration to an updated network configuration 144 that satisfies the natural language intent 112 in a declarative network configuration language. The verification component 136 is configured to verify whether the updated network configuration satisfies a configuration syntax of the declarative network configuration language to detect an error. The update component 134 is also configured to request the LLM 150 to update the updated network configuration 144 to correct the error. The deployment component 138 is configured to deploy the final network configuration 148 on the user network 160.

The user network 160 may include any network with configuration-based management, for example, using a declarative network configuration language. In some implementations, the user network 160 may be a virtual network implemented on a cloud network. For example, the deployment component 138 may provide the final network configuration 148 to an interface of the cloud provider to deploy the final network configuration 148 as a virtual network on the cloud network. Other configuration-based network deployments are possible. For example, the user network 160 may be a virtual network or a physical network. The resources or entities 164 for the user network 160 may be located on the cloud, edge, or other platforms. In some implementations, the user network 160 may be for general infrastructure or cluster management.

In some implementations, the IBN configuration application 130 includes the network verifier 140. The network verifier 140 is configured to verify whether the virtual network deployment satisfies user specified checks. For example, the network verifier 140 may be configured to transmit packets between entities 164 in the user network 160 to verify reachability of the entities 164. In some implementations, the user-specified checks are created or selected by the user 105, for example, as JavaScript object notation (JSON) files. In some implementations, the IBN configuration application 130 may request the large language model to generate the user specified checks based on the natural language intent 112. Because the network configuration and the checks for the network verifier 140 differ in format, LLM generated checks may be useful to check for consistency in interpretation of the intent 112.

In some implementations, the IBN configuration application 130 includes a user interface 152 for communication with the user device 110. For example, the user interface 152 may be a web application, command line interface, or graphical user interface. The user interface 152 may receive the intent 112 from the user 105 via the user device 110. In an aspect, where the verification component 136 detects an error in the updated configuration 144, the user interface 152 may output the error 114 to the user 105 via the user device 110. For example, the error 114 may indicate a category such as "Reference to undeclared resource" or "Invalid block definition." The error 114 may also indicate a portion of the updated configuration 144 including the error, for example, a copy of the line that triggered the error 114. The error 114 may also include a syntax rule that triggered the error. The user interface 152 may allow the user 105 to choose between a) sending the error 114 to the LLM 150 as feedback 116, b) aborting the update to the network configuration, or c) providing additional or alternative feedback 116. The update component 134 may receive the choice from the user 105 and send the request 146 to further update the updated configuration 144 based on the error 114 and/or feedback 116. The IBN configuration application 130 may iteratively verify the updated network configuration 144 and request the large language model to further update the network configuration based on any errors until the updated network configuration satisfies the configuration syntax of the declarative network configuration language. For example, the verification component 136 may receive the updated configuration 144 and report errors 114 to the user 105, and the update component may generate the request 146 based on the error 114 and any received feedback 116. When the verification component 136 receives a final configuration 148 that does not include any syntax errors, the verification component 136 may provide the final network configuration 148 to the deployment component 138.

In some implementations, the deployment component 138 generates a deployment plan 118 based on the final network configuration 148. The deployment component 138 may output the deployment plan 118 to the user 105 via the user interface 152 and the user device 110. The deployment plan 118 may include a list of configuration parameters and values. In some implementations, the deployment plan 118 may indicate changes in the final network configuration 148 from a currently deployed network configuration 162. In some implementations, some values of configuration parameters (e.g., identifiers, addresses, names, etc.) may not be known until the configuration is deployed. The user interface 152 may ask the user 105 to approve the deployment plan. The user device 110 may return an approval 119. The deployment component 138 deploy the final network configuration 148 to the user network as the configuration 162. The user network 160 may propagate the final network configuration 148 to the entities 164.

In some implementations, the user network 160 may provide an error in the case of a failed deployment. For instance, although the syntax of the final network configuration 148 may be correct, the user network 160 may not implement the final network configuration 148. For instance, the user network 160 may lack physical resources indicated in the final network configuration 148, or the final network configuration 148 may violate a policy of the user network 160 (e.g., if implemented on a cloud network). The user network 160 may provide an informative error message regarding a failed deployment. In an aspect, the informative error message may be similar to the error 114, and the IBN configuration application 130 may request user feedback and further update the configuration. Alternatively, a failed network deployment may require the user 105 to provide a new intent 112.

The network verifier 140 may verify whether the network deployment satisfies user specified checks. That is, after the configuration 162 is deployed on the user network 160, the network verifier 140 may perform one or more checks. For example, the checks may include reachability checks to determine whether network entities 164 are reachable from various locations (e.g., other entities) or using specified ports or protocols. The network verifier 140 may generate verification failure messages, for example, indicating which user specified checks failed. Similar to the network deployment error messages, the IBN configuration application 130 may update the network configuration based on the verification failure messages, or may request a new intent from the user 105.

FIG. 2 is a conceptual diagram 200 illustrating a technique for reducing a size of input to the LLM 150. In particular, the LLM 150 may have a token limit that defines a maximum size of input to the LLM 150. For instance, the token limit may be on the order of thousands of tokens. A complex network configuration may exceed the token limit of the LLM 150. Accordingly, the request 142 including the intent and the configuration or the request 146 including the request, errors, feedback, and configuration may be too large for the LLM 150 to process. In an aspect, the IBN configuration application 130 may select a subset of resource blocks of a configuration 162 or updated configuration 144 that are most relevant to the intent 112 to reduce the size of the prompt below the token limit.

A configuration 162 in a declarative network configuration language may include a plurality of resource blocks 210. A resource block 210 may be a high level grouping of configuration elements. For illustrative purposes, the configuration 162 may include resource blocks 210a, 210b, and 210c. The size of the intent 112 and the configuration 162 in tokens may be greater than the token limit of the LLM 150. The IBN configuration application 130 may utilize embedding-based retrieval to select a subset of resource blocks of the network configuration 162 to include in a request 142, 146.

The IBN configuration application 130 may generate a numerical embedding of the intent 112 as an intent embedding 222. The numerical embedding may be a vector of numerical values representing the context of the intent 112. The IBN configuration application 130 may generate a numerical embedding of each resource block 210 of the configuration 162 as resource block embeddings 220 (e.g., embeddings 220a, 220b, 220c). The embeddings 220 may be generated using the same algorithm as the intent embedding. The embeddings 220 may each be a vector of numerical values representing the context of the resource blocks. The IBN configuration application 130 may compare the resource block embeddings 220 to the intent embedding 222 to determine a block distance 230 for each of the resource blocks 210. The IBN configuration application 130 may then rank the resource blocks 210 based on the block distance 230 of the resource block embeddings 220 for each resource block 210. For example, the block distance 230b for the resource block 210b may be the smallest, indicating that the resource block 210b is closest to the intent 112 in context. The block distance 230c may be the next closest, and the block distance 230a may be the furthest. The IBN configuration application 130 may select a number of top ranked resource blocks 210 with a size less than the maximum input size of the LLM 150. For instance, the IBN configuration application 130 may select the subset of blocks including resource blocks 210b and 210c. Accordingly, a request 142 including the selected subset of resource blocks and the intent 112 (and or error 114 or feedback 116) may have a size less than the token limit of the LLM 150.

FIG. 3 is a schematic diagram of an example of an apparatus 300 (e.g., a computing device) for generating network configurations using a LLM 150. The apparatus 300 may be implemented as one or more computing devices in the system 120.

In an example, the apparatus 300 includes one or more processors 302 and one or more memories 304, individually or in combination, configured to execute or store instructions or other parameters related to providing an operating system 306, which can execute one or more applications or processes, such as, but not limited to, the IBN configuration application 130. For example, processors 302 and memory/memories 304 may be separate components communicatively coupled by a bus (e.g., on a motherboard or other portion of a computing device, on an integrated circuit, such as a system on a chip (SoC), etc.), components integrated within one another (e.g., a processor 302 can include the memory 304 as an on-board component), and/or the like. Memory 304 may store instructions, parameters, data structures, etc. for use/execution by processor 302 to perform functions described herein. In some implementations, the memory 304 includes a database 352 for use by the IBN configuration application 130. In some implementations, the apparatus 300 includes the LLM 150, for example, as another application executing on the processors 302. Alternatively, the LLM 150 may be executed on a different device that may be accessed via an API 350.

In an example, the IBN configuration application 130 includes the intent component 132, the update component 134, the verification component 136, and the deployment component 138 discussed above with respect to FIG. 1. The IBN configuration application 130 may optionally include the network verifier 140 discussed above with respect to FIG. 1. The IBN configuration application 130 may include the user interface 152. For instance, the user interface 152 may implement a user interface such as a web page or web application that receives input from the user 105. The IBN configuration application 130 may further include a retrieval component 310 configured to use embedding-based retrieval to select a subset of resource blocks of the network configuration to include in the request, as discussed above with respect to FIG. 2 For instance, the retrieval component 310 may: generate a numerical embedding of each resource block of the network configuration; generate a numerical embedding of the natural language intent; calculate a distance between the numerical embedding of the natural language intent and the numerical embedding of each resource block; rank the resource blocks based on the distance of the numerical embedding of each resource block; and select a number of top ranked resource blocks with a size less than the maximum input size of the large language model.

In some implementations, the apparatus 300 is implemented as a distributed processing system, for example, with multiple processors 302 and memories 304 distributed across physical systems such as servers, virtual machines, or datacenters 122. For example, one or more of the components of the IBN configuration application 130 may be implemented as services executing at different datacenters 122. The services may communicate via an API.

FIG. 4 is a flow diagram of an example of a method 400 generating a network configuration using a large language model. For example, the method 400 can be performed by the IBN configuration application 130, the apparatus 300 and/or one or more components thereof to generate a network configuration based on an intent 112 from a user 105 using the LLM 150.

At block 410, the method 400 includes receiving, at an interface between a user and a large language model, a natural language intent for a network configuration. For example, in an aspect, apparatus 300, processor(s) 302, memory/memories 304, IBN configuration application 130, and/or intent component 132 may be configured to or may comprise means for receiving, at an interface between a user 105 and the LLM 150, a natural language intent 112 for a network configuration. For example, the receiving at block 410 may include providing a user interface (e.g., website or application) to the user and receiving a packet (e.g., an IP packet) including the natural language intent 112. Further, for example, the receiving at block 410 may provide a simplified interface to the LLM 150 that asks the user 105 to input the intent and/or identify an existing network configuration.

At block 420, the method 400 includes requesting the large language model to update the network configuration to an updated network configuration that satisfies the natural language intent in a declarative network configuration language. For example, in an aspect, apparatus 300, processor(s) 302, memory/memories 304, IBN configuration application 130, and/or update component 134 may be configured to or may comprise means for requesting the LLM 150 to update the network configuration 162 to an updated network configuration 144 that satisfies the natural language intent 112 in a declarative network configuration language. For example, the requesting at block 420 may include calling an API 350 of the LLM 150 on a prompt including the intent 112 and a current network configuration 162. In some implementations, a size of the network configuration 162 exceeds a maximum input size of the LLM 150. In an alternative or additional aspect, at sub-block 422, the block 420 may optionally include selecting a subset of resource blocks 210 of the network configuration 162 to include in the request using embedding-based retrieval. Further details of sub-block 422 are described below with respect to FIG. 5.

At block 430, the method 400 includes verifying whether the updated network configuration satisfies a configuration syntax of the declarative network configuration language to detect an error. For example, in an aspect, apparatus 300, processor(s) 302, memory/memories 304, IBN configuration application 130, and/or verification component 136 may be configured to or may comprise means for verifying whether the updated network configuration 144 satisfies a configuration syntax of the declarative network configuration language to detect an error 114. For example, the verifying at block 430 may include applying a set of syntactic rules of the declarative network configuration language to the updated network configuration 144. The syntactic rules of the declarative network configuration language may be pre-defined.

Referring to an alternative or additional aspect, at block 440, the method 400 may further include receiving user input regarding the error. For example, in an aspect, For example, in an aspect, apparatus 300, processor(s) 302, memory/memories 304, IBN configuration application 130, and/or user interface 152 may be configured to or may comprise means for receiving user input (e.g., feedback 116) regarding the error 114. For example, the user 105 may approve sending the error to the LLM 150, or may enter a different explanation of the error as feedback 116. Accordingly, the errors generated by the verification component 136 may be checked by a human and the user 105 stays in the loop as the network configuration is being modified.

At block 450, the method 400 includes requesting the large language model to update the updated network configuration to correct the error. For example, in an aspect, apparatus 300, processor(s) 302, memory/memories 304, IBN configuration application 130, and/or update component 134 may be configured to or may comprise means for requesting the LLM 150 to update the updated network configuration 144 to correct the error 114. For example, the verification component 136 may generate the request 146, which may include the updated configuration 144, the error 114, and/or the feedback 116. The verification component 136 may provide the request 146 as a prompt to the LLM 150. The addition of the error 114 and/or the feedback 116 may provide additional context that the LLM 150 can use to improve the updated configuration.

In some implementations, the method 400 includes iteratively verifying the updated network configuration and requesting the large language model to further update the network configuration based on any errors until the updated network configuration satisfies the configuration syntax of the declarative network configuration language. For example, the apparatus 300, processor(s) 302, memory/memories 304, IBN configuration application 130, and/or verification component 136 may be configured to repeat blocks 430, 440, and 450 until the LLM 150 returns the correct configuration 148 that does not include any errors and passes the verification based on the set of syntactic rules of the declarative network configuration language.

At block 460, the method 400 includes deploying the updated network to a user network. For example, in an aspect, the apparatus 300, processor(s) 302, memory/memories 304, IBN configuration application 130, and/or deployment component 138 may be configured to or may comprise means for deploying the updated network to a user network. For example, the deploying at block 460 may include outputting the network configuration 162 to the user network 160 and propagating the network configuration 162 to individual entities 164. In some implementations, where the user network 160 is implemented on a cloud network, the deployment component 138 may provide the final network configuration 148 to an interface of the cloud network. In an alternative or additional aspect, at sub-block 462, the block 460 may optionally include displaying a network deployment plan 118 to the user 105 prior to deploying the updated network configuration. For instance, the deployment component 138 may display the deployment plan 118 via the user interface 152. The deployment component 138 may receive approval 119 from the user 105 via the user interface 152. In some implementations, deployment of the final network configuration 148 may be unsuccessful. The user network 160 may return an error indicating a failed deployment. Further details of block 460 regarding such errors are described further below regarding FIG. 6.

Referring to an alternative or additional aspect, at block 470, the method 400 optionally includes verifying whether the user network satisfies user specified checks. For example, in an aspect, the apparatus 300, processor(s) 302, memory/memories 304, IBN configuration application 130, and/or network verifier 140 may be configured to or may comprise means for verifying whether the user network satisfies user specified checks. For example, the verifying at block 470 may include providing the network verifier 140 with the user-specified checks. For instance, the user specified checks may be JSON files. The user specified checks may be generated by the user, possibly following a template selected from a list. In an alternative or additional aspect, at sub-block 472, the block 470 may optionally include requesting the LLM 150 to generate the user specified checks based on the natural language intent 112. For instance, the JSON format for user specified checks may have been included in the training corpus for the LLM 150, or the LLM 150 may be further trained based on such checks. Accordingly, the LLM 150 may provide a template check that may require user editing. In another alternative or additional aspect, at sub-block 474, the block 470 may optionally include transmitting packets between entities 164 in the user network 160 to verify reachability of the entities. For instance, in a virtual network, the network verifier 140 may operate on the underlying cloud network to transmit the packets between entities 164. For other network types, an entity 164 within the user network 160 may act as an agent of the network verifier 140. In some implementations, when the verifying in block 470 is unsuccessful, the method 400 may return to block 410 for the user 105 to provide a new natural language intent. In other implementations, when the verifying in block 470 is unsuccessful, the method 400 may return to block 420 to request the LLM 150 to update the configuration based on an error generated by the network verifier 140.

Referring to FIG. 5, a method 500 provides an example implementation of using embedding-based retrieval to select a subset of resource blocks in sub-block 422. In an alternative or additional aspect, at block 510, the selecting at sub-block 422 of the subset of resource blocks includes generating a numerical embedding of each resource block of the network configuration. For example, the retrieval component 310 may apply an embedding algorithm to generate the intent embedding 222 from the intent 112.

In this optional aspect, at block 520, the selecting at sub-block 422 of the subset of resource blocks includes generating a numerical embedding of the natural language intent. For example, the retrieval component 310 may apply the same embedding algorithm to each of the resource blocks 210 of the network configuration 162 to generate the resource block embeddings 220.

In this optional aspect, at block 530, the selecting at sub-block 422 of the subset of resource blocks includes calculating a distance between the numerical embedding of the natural language intent and the numerical embedding of each resource block. For example, the retrieval component 310 may apply vector subtraction to the intent embedding 222 and each of the resource block embeddings 220 to calculate the block distances 230.

In this optional aspect, at block 540, the selecting at sub-block 422 of the subset of resource blocks includes ranking the resource blocks based on the distance of the numerical embedding of each resource block. For example, the retrieval component 310 may rank the resource blocks 210 based on the block distances 230 with the resource blocks 210 that are closest to the intent 112 being at the top.

In this optional aspect, at block 550, the selecting at sub-block 422 of the subset of resource blocks includes selecting a number of top ranked resource blocks with a size less than the maximum input size of the large language model. For example, the retrieval component 310 may selecting a number of top ranked resource blocks 210 with a size less than the maximum input size of the LLM 150. For instance, the retrieval component 310 may add the next ranked resource block 210 as long as the total size of the request 142 is less than the maximum input size of the LLM 150.

In view of the foregoing, using embedding-based retrieval may identify the most relevant resource blocks 210 to include in the prompt to the LLM 150. In an aspect, if changes to other blocks are required, the verifications in blocks 430 or 470 may identify errors caused by excluding resource blocks 210 from the request 142, 146. The previously excluded resource blocks may be identified by the embedding-based retrieval in subsequent requests.

Referring to FIG. 6, a method 600 provides additional actions that may be performed in conjunction with the method 400. For example, the method 600 may optionally be performed within or after block 460. In an alternative or additional aspect, at block 610, the method 600 includes receiving an error from the user network indicating a failed deployment. For example, the deployment component 138 may receive the error in response to deploying the updated network configuration in block 460. For instance, in a cloud environment, the error message may be received from an interface of the cloud network provider. As another example, in a physical network, the error message may be an indication that an entity identified in the final network configuration 148 does not exist or failed to be configured according to the final network configuration 148.

In this optional aspect, at block 620, the method 600 includes requesting the large language model to update the network configuration to correct the error and prevent the failed deployment. For example, the deployment component 138 may request the LLM 150 to update the network configuration to correct the error and prevent the failed deployment. For instance, the request may be similar to the request 146, except with the error from the user network rather than an error from the verification component 136.

Figure 7:
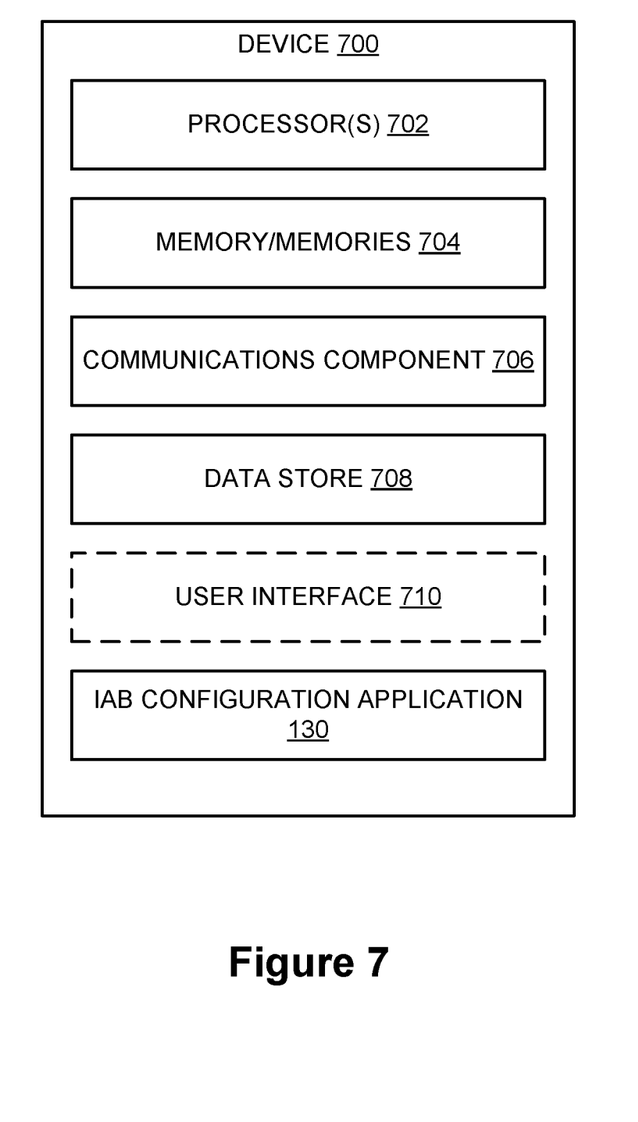
FIG. 7 is a schematic diagram of an example of a device for performing functions of generating a network configuration using a LLM, in accordance with aspects described herein.

FIG. 7 illustrates an example of a device 700 including additional optional component details as those shown in FIG. 3. In one aspect, device 700 includes processor 702, which may be similar to processor(s) 302 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 further includes memory 704, which may be similar to memory 304 such as for storing local versions of operating systems (or components thereof) and/or applications being executed by processor 702, such as the IBN configuration application 130, intent component 132, update component 134, verification component 136, deployment component 138, network verifier 140, user interface 152, retrieval component 310, etc. Memory 704 can include a type of memory usable by a computer, such as random access memory (RAM), read only memory (ROM), tapes, magnetic discs, optical discs, volatile memory, non-volatile memory, and any combination thereof. The processor 702 may execute instructions stored on the memory 704 to cause the device 700 to perform the methods discussed above with respect to FIGS. 4-6.

Further, device 700 includes a communications component 706 that provides for establishing and maintaining communications with one or more other devices, parties, entities, etc. utilizing hardware, software, and services as described herein. Communications component 706 carries communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc. not currently being executed by processor 702. In addition, data store 708 may be a data repository for the IBN configuration application 130.

Device 700 may optionally include a user interface component 710 operable to receive inputs from a user of device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 additionally includes the IBN configuration application 130 for generating a network configuration using the LLM 150.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on computer-readable media. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The following numbered clauses provide an overview of aspects of the present disclosure:

Clause 1. An apparatus comprising: one or more memories storing computer executable instructions; and one or more processors coupled with the one or more memories and, individually or in combination, configured to: receive, at an interface between a user and a large language model, a natural language intent for a network configuration; request the large language model to update the network configuration to an updated network configuration that satisfies the natural language intent in a declarative network configuration language; verify whether the updated network configuration satisfies a configuration syntax of the declarative network configuration language to detect an error; request the large language model to update the updated network configuration to correct the error; and deploy the updated network configuration to a user network.

Clause 2. The apparatus of clause 1, wherein the one or more processors, individually or in combination, are further configured to verify whether the user network satisfies user specified checks.

Clause 3. The apparatus of clause 2, wherein to verify whether the user network satisfies user specified checks, the one or more processors, individually or in combination, are further configured to transmit packets between entities in the user network to verify reachability of the entities.

Clause 4. The apparatus of clause 2 or 3, wherein the one or more processors, individually or in combination, are further configured to request the large language model to generate the user specified checks based on the natural language intent.

Clause 5. The apparatus of any of clauses 1-4, wherein the one or more processors, individually or in combination, are configured to iteratively verify the updated network configuration and request the large language model to further update the network configuration based on any errors until the updated network configuration satisfies the configuration syntax of the declarative network configuration language.

Clause 6. The apparatus of any of clauses 1-5, wherein the one or more processors, individually or in combination, are configured to receive user input regarding the error, wherein the request for the large language model to update the network configuration to correct the error includes the user input.

Clause 7. The apparatus of any of clauses 1-6, wherein a size of the network configuration exceeds a maximum input size of the large language model, wherein a request to the large language model to update the network configuration uses embedding-based retrieval to select a subset of resource blocks of the network configuration to include in the request.

Clause 8. The apparatus of clause 7, wherein to use embedding-based retrieval, the one or more processors, individually or in combination, are configured to: generate a numerical embedding of each resource block of the network configuration; generate a numerical embedding of the natural language intent; calculate a distance between the numerical embedding of the natural language intent and the numerical embedding of each resource block; rank the resource blocks based on the distance of the numerical embedding of each resource block; and select a number of top ranked resource blocks with a size less than the maximum input size of the large language model.

Clause 9. The apparatus of any of clauses 1-8, wherein to deploy the updated network configuration as a virtual network deployment on a cloud network platform, the one or more processors, individually or in combination, are configured to display a network deployment plan to the user prior to deploying the updated network configuration.

Clause 10. The apparatus of any of clauses 1-9, wherein the one or more processors, individually or in combination, are configured to: receive an error from the user network indicating a failed deployment; and request the large language model to update the network configuration to correct the error and prevent the failed deployment.

Clause 11. A method comprising: receiving, at an interface between a user and a large language model, a natural language intent for a network configuration; requesting the large language model to update the network configuration to an updated network configuration that satisfies the natural language intent in a declarative network configuration language; verifying whether the updated network configuration satisfies a configuration syntax of the declarative network configuration language to detect an error; requesting the large language model to update the updated network configuration to correct the error; and deploying the updated network configuration to a user network.

Clause 12. The method of clause 11, further comprising verifying whether the user network satisfies user specified checks.

Clause 13. The method of clause 12, wherein verifying whether the user network satisfies user specified checks comprises transmitting packets between entities in the user network to verify reachability of the entities.

Clause 14. The method of clause 12 or 13, further comprising requesting the large language model to generate the user specified checks based on the natural language intent.

Clause 15. The method of any of clauses 11-14, wherein the verifying whether the updated network configuration satisfies a configuration syntax of the declarative network configuration language comprises iteratively verifying the updated network configuration and requesting the large language model to further update the network configuration based on any errors until the updated network configuration satisfies the configuration syntax of the declarative network configuration language.

Clause 16. The method of any of clauses 11-15, further comprising receiving user input regarding the error, wherein the request for the large language model to update the network configuration to correct the error includes the user input.

Clause 17. The method of any of clauses 11-16, wherein a size of the network configuration exceeds a maximum input size of the large language model, wherein the request to the large language model to update the network configuration uses embedding-based retrieval to select a subset of resource blocks of the network configuration to include in the request.

Clause 18. The method of clause 17, wherein using embedding-based retrieval to select a subset of resource blocks of the network configuration to include in the request comprises: generating a numerical embedding of each resource block of the network configuration; generating a numerical embedding of the natural language intent; calculating a distance between the numerical embedding of the natural language intent and the numerical embedding of each resource block; ranking the resource blocks based on the distance of the numerical embedding of each resource block; and selecting a number of top ranked resource blocks with a size less than the maximum input size of the large language model.

Clause 19. The method of any of clauses 11-18, wherein deploying the updated network configuration to the user network comprises displaying a network deployment plan to the user prior to deploying the updated network configuration.

Clause 20. The method of any of clauses 11-19, further comprising: receiving an error from the user network indicating a failed deployment; and requesting the large language model to update the network configuration to correct the error and prevent the failed deployment.

Clause 21. One or more non-transitory computer-readable media having stored thereon computer-executable instructions that when executed by one or more processors, individually or in combination, cause the one or more processors to perform the method of any of clauses 11-20.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus comprising:
one or more memories storing computer executable instructions; and
one or more processors coupled with the one or more memories and, individually or in combination, configured to:
receive, at an interface between a user and a large language model, a natural language intent for a network configuration;
request the large language model to update the network configuration to an updated network configuration that satisfies the natural language intent in a declarative network configuration language;
verify whether the updated network configuration satisfies a configuration syntax of the declarative network configuration language to detect an error;
request the large language model to update the updated network configuration to correct the error; and
deploy the updated network configuration to a user network.

2. The apparatus of claim 1, wherein the one or more processors, individually or in combination, are further configured to verify whether the user network satisfies user specified checks.

3. The apparatus of claim 2, wherein to verify whether the user network satisfies user specified checks, the one or more processors, individually or in combination, are further configured to transmit packets between entities in the user network to verify reachability of the entities.

4. The apparatus of claim 2, wherein the one or more processors, individually or in combination, are further configured to request the large language model to generate the user specified checks based on the natural language intent.

5. The apparatus of claim 1, wherein the one or more processors, individually or in combination, are configured to iteratively verify the updated network configuration and request the large language model to further update the network configuration based on any errors until the updated network configuration satisfies the configuration syntax of the declarative network configuration language.

6. The apparatus of claim 1, wherein the one or more processors, individually or in combination, are configured to receive user input regarding the error, wherein the request for the large language model to update the network configuration to correct the error includes the user input.

7. The apparatus of claim 1, wherein a size of the network configuration exceeds a maximum input size of the large language model, wherein a request to the large language model to update the network configuration uses embedding-based retrieval to select a subset of resource blocks of the network configuration to include in the request.

8. The apparatus of claim 7, wherein to use embedding-based retrieval, the one or more processors, individually or in combination, are configured to:
generate a numerical embedding of each resource block of the network configuration;
generate a numerical embedding of the natural language intent;
calculate a distance between the numerical embedding of the natural language intent and the numerical embedding of each resource block;
rank the resource blocks based on the distance of the numerical embedding of each resource block; and
select a number of top ranked resource blocks with a size less than the maximum input size of the large language model.

9. The apparatus of claim 1, wherein to deploy the updated network configuration to the user network, the one or more processors, individually or in combination, are configured to display a network deployment plan to the user prior to deploying the updated network configuration.

10. The apparatus of claim 1, wherein the one or more processors, individually or in combination, are configured to:
receive an error from the user network indicating a failed deployment; and
request the large language model to update the network configuration to correct the error and prevent the failed deployment.

11. A method comprising:
receiving, at an interface between a user and a large language model, a natural language intent for a network configuration;
requesting the large language model to update the network configuration to an updated network configuration that satisfies the natural language intent in a declarative network configuration language;
verifying whether the updated network configuration satisfies a configuration syntax of the declarative network configuration language to detect an error;
requesting the large language model to update the updated network configuration to correct the error; and
deploying the updated network configuration to a user network.

12. The method of claim 11, further comprising verifying whether the user network satisfies user specified checks.

13. The method of claim 12, wherein verifying whether the user network satisfies user specified checks comprises transmitting packets between entities in the user network to verify reachability of the entities.

14. The method of claim 12, further comprising requesting the large language model to generate the user specified checks based on the natural language intent.

15. The method of claim 11, wherein the verifying whether the updated network configuration satisfies a configuration syntax of the declarative network configuration language comprises iteratively verifying the updated network configuration and requesting the large language model to further update the network configuration based on any errors until the updated network configuration satisfies the configuration syntax of the declarative network configuration language.

16. The method of claim 11, further comprising receiving user input regarding the error, wherein the request for the large language model to update the network configuration to correct the error includes the user input.

17. The method of claim 11, wherein a size of the network configuration exceeds a maximum input size of the large language model, wherein the request to the large language model to update the network configuration uses embedding-based retrieval to select a subset of resource blocks of the network configuration to include in the request.

18. The method of claim 17, wherein using embedding-based retrieval to select a subset of resource blocks of the network configuration to include in the request comprises:
generating a numerical embedding of each resource block of the network configuration;
generating a numerical embedding of the natural language intent;
calculating a distance between the numerical embedding of the natural language intent and the numerical embedding of each resource block;

ranking the resource blocks based on the distance of the numerical embedding of each resource block; and selecting a number of top ranked resource blocks with a size less than the maximum input size of the large language model.

19. The method of claim 11, wherein deploying the updated network configuration to the user network comprises displaying a network deployment plan to the user prior to deploying the updated network configuration.

20. The method of claim 11, further comprising:

receiving an error from the user network indicating a failed deployment; and requesting the large language model to update the network configuration to correct the error and prevent the failed deployment.

21. One or more non-transitory computer-readable media having stored thereon computer-executable instructions that when executed by one or more processors, individually or in combination, cause the one or more processors to:

receive, at an interface between a user and a large language model, a natural language intent for a network configuration;

request the large language model to update the network configuration to an updated network configuration that satisfies the natural language intent in a declarative network configuration language;

verify whether the updated network configuration satisfies a configuration syntax of the declarative network configuration language to detect an error;

request the large language model to update the updated network configuration to correct the error; and deploy the updated network configuration to a user network.

\* \* \* \* \*